(12) United States Patent
Miura

(10) Patent No.: US 10,559,087 B2
(45) Date of Patent: Feb. 11, 2020

(54) INFORMATION PROCESSING APPARATUS AND METHOD OF CONTROLLING THE SAME

(71) Applicant: CANON KABUSHIKI KAISHA, Tokyo (JP)

(72) Inventor: Seishi Miura, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/783,376

(22) Filed: Oct. 13, 2017

(65) Prior Publication Data
US 2018/0108145 A1    Apr. 19, 2018

(30) Foreign Application Priority Data

Oct. 14, 2016   (JP) ................................ 2016-203037
Sep. 1, 2017    (JP) ................................ 2017-168835

(51) Int. Cl.
| | | |
|---|---|---|
| G06T 7/70 | (2017.01) | |
| G06T 7/593 | (2017.01) | |
| G06T 19/00 | (2011.01) | |
| G01S 17/02 | (2006.01) | |
| H04N 13/239 | (2018.01) | |
| G01S 17/10 | (2006.01) | |

(52) U.S. Cl.
CPC .............. G06T 7/70 (2017.01); G01S 17/023 (2013.01); G06T 7/593 (2017.01); G06T 19/006 (2013.01); H04N 13/239 (2018.05); *G01S 17/10* (2013.01); *G06T 2207/10021* (2013.01); *G06T 2207/10028* (2013.01); *G06T 2207/20221* (2013.01)

(58) Field of Classification Search
CPC ................................ G06T 19/006; G06T 7/70
USPC ........................................................... 345/633
See application file for complete search history.

(56) References Cited

U.S. PATENT DOCUMENTS

| | | | |
|---|---|---|---|
| 9,204,050 B2 * | 12/2015 | Emura | .................. G06F 3/0488 |
| 2013/0257908 A1 * | 10/2013 | Ota | ........................ G06T 19/006 |
| | | | 345/633 |
| 2016/0260261 A1 * | 9/2016 | Hsu | ........................ G06T 19/006 |
| 2018/0100762 A1 * | 4/2018 | Park | ...................... G01J 1/0228 |

FOREIGN PATENT DOCUMENTS

JP          5818773 B2     11/2015

* cited by examiner

*Primary Examiner* — Ryan R Yang
(74) *Attorney, Agent, or Firm* — Carter, DeLuca & Farrell LLP

(57) ABSTRACT

An apparatus comprises a first acquisition unit which acquires an captured image in a real space from an image capturing unit provided for a display apparatus; a second acquisition unit which acquires data, from a measuring unit provided for the display apparatus, indicating a distance from the display apparatus to an object in the real space; a generating unit which generates, based on the data acquired by the second acquisition unit, an image by superimposing CG on the captured image; and a setting unit which sets a measurement frequency of the measuring unit to a first frequency if a specific object is included in the captured image, and sets the measurement frequency of the measuring unit to a second frequency lower than the first frequency if the specific object is not included in the captured image.

15 Claims, 6 Drawing Sheets

INFORMATION PROCESSING APPARATUS AND METHOD OF CONTROLLING THE SAME

BACKGROUND OF THE INVENTION

Field of the Invention

The present invention relates to an information processing apparatus and a method of controlling the same.

Description of the Related Art

A mixed reality technique (Mixed reality; hereinafter MR) in which a virtual space created by a computer is blended with a real space seamlessly is known. In the MR technique, application to various fields, such as assembly verification in which, during assembly work, a work procedure or a wiring state is superimposed is a display, is advancing. In the MR technique employing a video see-through type HMD, a real space image is acquired from a camera which is an image capturing apparatus integrated in the HMD and is displayed on a display apparatus of the HMD with a virtual object superimposed thereon. In the MR technique, in order to correctly represent in front/behind relationship between a physical object (a hand of an operator on whom the HMD is mounted for example) and a virtual object, three-dimensional position information of the physical object and the virtual object is obtained. Specifically, in a case where three-dimensional position information of the physical object and three-dimensional position information of the virtual object are compared and the physical object is in front, the captured image is displayed in the front. It is necessary to correctly obtain the three-dimensional position of the physical object in order to correctly represent an in front/behind relationship.

Japanese Patent No. 5818733 attempts to improve a three-dimensional position measurement accuracy of a physical object by using a depth sensor.

In an MR system, it is possible to obtain the three-dimensional position of the physical object by a stereo method from images in which a real space was captured by cameras arranged to correspond to left and right eyes. However, as described above, by providing a distance measuring unit (depth sensor) separate from the cameras, it is possible to cause the accuracy of the three-dimensional position information to improve by using a distance measurement result obtained by the distance measuring unit independently or by using it together with a distance measurement result obtained from the cameras. As a consequence however, there is a problem in that power consumption increases because more apparatuses, circuits, and the like are caused to operate.

SUMMARY OF THE INVENTION

The present invention was conceived in view of this problem, and provides a technique in which even though a measurement unit is present, it is possible to detect a position with high accuracy while suppressing an increase in power consumption simply due to arranging the measuring means, and presentation of a natural mixed reality is thereby enabled.

According to an aspect of the invention, there is provided an information processing apparatus connected to an image display apparatus, comprising: a first acquisition unit configured to acquire a real space image captured by an image capturing unit provided for the image display apparatus; a second acquisition unit configured to acquire data that is measured by a measuring unit provided for the image display apparatus, and that indicates a distance from the image display apparatus to an object included in the real space; a generating unit configured to, based on the data that indicates the distance acquired by the second acquisition unit, generate a combined image by superimposing CG on the image acquired by the first acquisition unit; and a setting unit configured to set a measurement frequency of the measuring unit to a first measurement frequency in a case where a specific object is included in the image acquired by the first acquisition unit, and to set the measurement frequency of the measuring unit to a second measurement frequency lower than the first measurement frequency in a case where the specific object is not included in the image acquired the first acquisition unit.

By virtue of the present invention, even though a measurement means is present in addition to the cameras, it becomes possible to detect a position with high accuracy while suppressing an increase in power consumption simply due to the measurement means, and to present a natural mixed reality.

Further features of the present invention will become apparent from the following description of exemplary embodiments (with reference to the attached drawings).

DESCRIPTION OF THE EMBODIMENTS

Hereinafter, embodiments according to the present invention are described in detail in accordance with the accompanying drawings.

First Embodiment

In the first embodiment, a description is given of an example in which a hand of a user, on whom a video see-through type HMD is mounted, is captured by a stereo camera and a depth sensor, a first and second depth value of the region of the hand are estimated, and then a CG model image is processed in accordance with an in front/behind relationship between a CG model and the hand based on a result of the estimation, and a combination of the sensed image and the CG model is displayed on a display of an HMD.

Figure 1A:
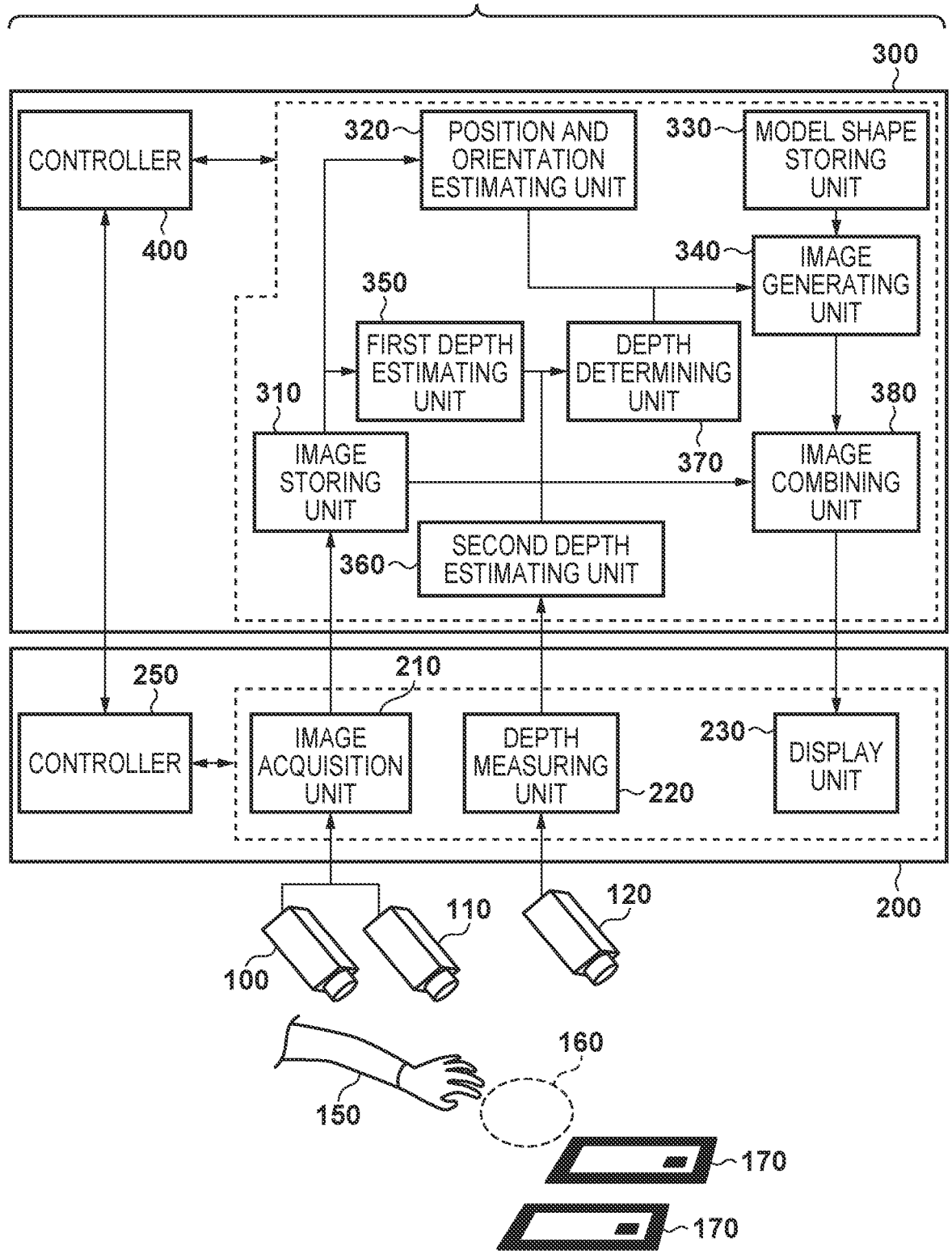
FIG. 1A is a view illustrating a configuration of a mixed-reality presentation system according to an embodiment.

FIG. 1A is a block configuration diagram of a mixed-reality presentation system in the present embodiment. This system is configured by an HMD 200 and an information processing apparatus 300. The HMD 200 and the information processing apparatus 300 are communicably connected to each other. A state of connection may be wired/wireless.

The HMD 200 has a controller 250 which manages control of the entire HMD apparatus. Cameras 100 and 110 which function as a stereo camera and a depth camera 120 which is positioned in the vicinity thereof are mounted to the HMD 200. Also, the HMD 200 has an image acquisition unit 210 which acquires captured images from the cameras 100 and 110 and transmits them to the information processing apparatus 300. Also, the HMD 200 has a depth measuring unit 220 which acquires a depth image (an image in which a pixel value represents a distance) from the depth camera 120 and transmits this to the information processing apparatus 300. Also, the HMD 200 has a display unit 230 which receives and displays a combined image of a CG model and an actual captured image from the information processing apparatus 300.

In order to simplify the description, a capturing field of view of the cameras 100 and 110 and the depth camera 120, and a displaying field of view of the display unit 230 in the embodiment are described as being the same. It is assumed that the cameras 100 and 110 and the depth camera 120 each capture at 30 frames/second.

Figure 1B:
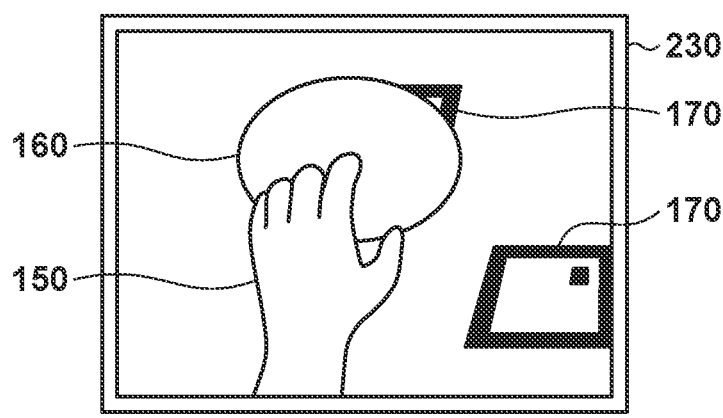
FIG. 1B is a view illustrating an example of an image which is displayed on an HMD.

FIG. 1B illustrates an example of displaying to a display screen of the display unit 230. FIG. 1B illustrates an example of displaying a combined image in a case where a CG object 160 is positioned behind a hand 150 of the user. In FIG. 1A, because the CG object 160 is not present, it is indicated by a dashed line.

The information processing apparatus 300 is configured by a CPU, a ROM, and a RAM or the like and includes a controller 400 which manages control of the entire the apparatus. The information processing apparatus 300 has an image storing unit 310, a position and orientation estimating unit 320, a model shape storing unit 330, an image generating unit 340, a first depth estimating unit 350, a second depth estimating unit 360, a depth determining unit 370, and an image combining unit 380. Note, the image storing unit 310 and the model shape storing unit 330 can be realized with storage apparatuses such as a hard disk, and others can be realized by the controller 400 executing an application program. Of course, some may be realized by hardware within the CPU.

The image storing unit 310 temporarily stores captured images (stereoscopic images) transmitted from the HMD 200.

The position and orientation estimating unit 320 estimates a position and orientation of the HMD 200 (strictly cameras 100 and 110) from the stereoscopic images stored in the image storing unit 310. There a technique for estimating the position and orientation of the HMD 200 in which a plurality of markers 170 (with reference to FIG. 1B) for detection of position and orientation are arranged within the real space, and the position and orientation of the HMD 200 is estimated from the markers within a captured image, and it is assumed that this is followed in the present embodiment. For example, configuration may be taken such that an image is binarized, vertices of a rectangle are extracted, and the camera position and orientation is estimated by minimizing a projection error in images by an iterative calculation in a hill-climbing method. Note, as long as the position and orientation of the HMD 200 are detectable, there is no particular restriction to this configuration. For example, configuration may be taken such that the position and orientation of the HMD 200 is measured using another measurement method such as a motion capture apparatus or a magnetic sensor.

The first depth estimating unit 350 acquires a stereoscopic image from the image storing unit 310, uses a stereo matching method to generates first depth estimation information (an image in which a depth estimation value is made to be a pixel value) from the perspective of the viewpoint position of the user on whom the HMD is mounted, and outputs the information. The second depth estimating unit 360 acquires a depth image received from the depth measuring unit 220 and outputs it as second depth estimation information. The depth determining unit 370 determines the more reliable depth estimation information from the first depth estimation information and the second depth estimation information and outputs it to the image generating unit 340. Here, as a method for determining the more reliable depth estimation information, it is possible to appropriately apply a method for complementing a portion whose accuracy is inferior in each estimation method, or a method for diving usage by a simple average, a distance, or a position.

In the position and orientation estimating unit 320, the position and orientation of the cameras 100 and 110 is measured. In the present embodiment, the position and orientation of the cameras 100 and 110 is estimated based on a projected image of a square marker 170 reflected in the captured image. For example, configuration may be taken such that an image is binarized, vertices of a rectangle are extracted, and the position and orientation of the cameras 100 and 110 is estimated by minimizing a projection error in images by an iterative calculation in a hill-climbing method. Note that the present embodiment does not depend on the estimation method of the position and orientation estimating unit 320, and may measure the position and orientation of the image capturing apparatus by using other measurement methods such as a motion capture apparatus or a magnetic sensor.

The model shape storing unit 330 stores in advance the position where the CG object 160 exists in the real space, and shape information for rendering. Note, there is no restriction to the number of stored virtual objects.

The image generating unit 340 generates an image of a CG model 160 based on the CG object 160 stored in the model shape storing unit 330, the three-dimensional shape of the hand 150 based on the depth estimation information from the depth determining unit 370, and the position and orientation of the HMD 200 acquired from the position and orientation estimating unit 320. The image generating unit 340 determines whether or not the CG object will be rendered by comparing an in front/behind relationship with the hand 150 in a rendered pixel of the CG object 160, then performs the rendering. Specifically, the pixel of the CG object 160 is not rendered in a pixel at a pixel position where it is determined that the hand 150 is in front of the CG object 160.

The image combining unit 380 combines each rendering result of the CG object 160 that the image generating unit 340 generated with the respective images of the cameras 100 and 110 stored in the image storing unit 310, and generates a stereo combined image. Note, in the embodiment, although a CG object and a real image of the hand 150 are combined, configuration may be taken such that a CG object of a hand, after the three-dimensional shape of the hand 150 is modeled, is generated and combined. The image combining unit 380 transmits the stereo combined image to the display unit 230. As a result, images corresponding to the left and right eyes of the user are displayed to the display unit 230, and the in front/behind relationship of the CG object and the hand 150 of the user is visually presented to the user.

As described above, it is possible to use both the first depth estimating unit 350 and second depth estimating unit 360 which are based on differing principles to increase depth measurement accuracy. However, it is not necessary for the measurement accuracy of a distance to always be high. For example, in a case where a hand is not within the screen or in a case where a CG object and a hand are far apart, a high measurement accuracy is not necessary.

Accordingly, in the present embodiment, it is determined whether or not a situation is such that accuracy is necessary. Also, in a case where it is determined that the situation is such that accuracy is not needed, the measurement accuracy of a configuration other than a configuration according to a depth estimation by the cameras 100 and 110 among the plurality of configurations for depth estimation (a configuration related to the depth camera 120 since two types are described in the embodiment) is dropped, and depending on the case, idling is caused, and total power consumption is reduced. Note, the configuration for depth estimation by the cameras 100 and 110 is not being made to be a target for reducing the power consumption because a real-time captured image (a CG object combined image) is displayed on the display unit 230 that the HMD 200 has.

In a case in which the normal capture framerate of the depth camera 120 is 30 frames/second, it is lowered to 10 frames/second for example (the ability to move may be stopped depending on the case) as a specific method for causing a reduction in power consumption. Also, because this means the second depth estimating unit 360 can also be lowered to ⅓ of the normal processing, for example, configuration may be taken such that the frequency of the driving clock supplied to the second depth estimating unit 360 is lowered to a level to match up with the processing. Furthermore, the depth camera 120 may lower the driving cycle of an LED emitting light for measurement in a case where a depth sensor of a TOF (Time Of Flight) method is employed. As described above, it is possible to suppress the HMD 200 and the information processing apparatus 300 from pointlessly consuming power. Specifically, in a case where the HMD 200 operates with an integrated battery as the power supply, it is possible to save operation time.

Here, in the present embodiment, the controller 400 of the information processing apparatus 300 determines whether or not a target (hereinafter referred to as a measurement target object) for which an in front/behind relationship with the CG object is desired to be correctly represented is captured in the images captured by the cameras 100 and 110 of the HMD 200 (at least one of the two images). Also, in a case where a measurement target object is not in a captured image, the controller 400 makes a request to the controller 250 of the HMD 200 to lower the frequency of the driving clock supplied to the second depth estimating unit 360 and to lower the capture framerate in the depth camera 120. In a case where this request is received, the controller 250 of the HMD 200 controls the depth measuring unit 220 and causes the capture framerate of the depth camera 120 to be lowered from 30 frames/second to 10 frames/second for example. Also, in a case where the depth camera 120 employs a depth sensor of the TOF method as previously described, the drive cycle of the LED for emitting light is changed in accordance with the framerate.

Figures 2A, 2B:
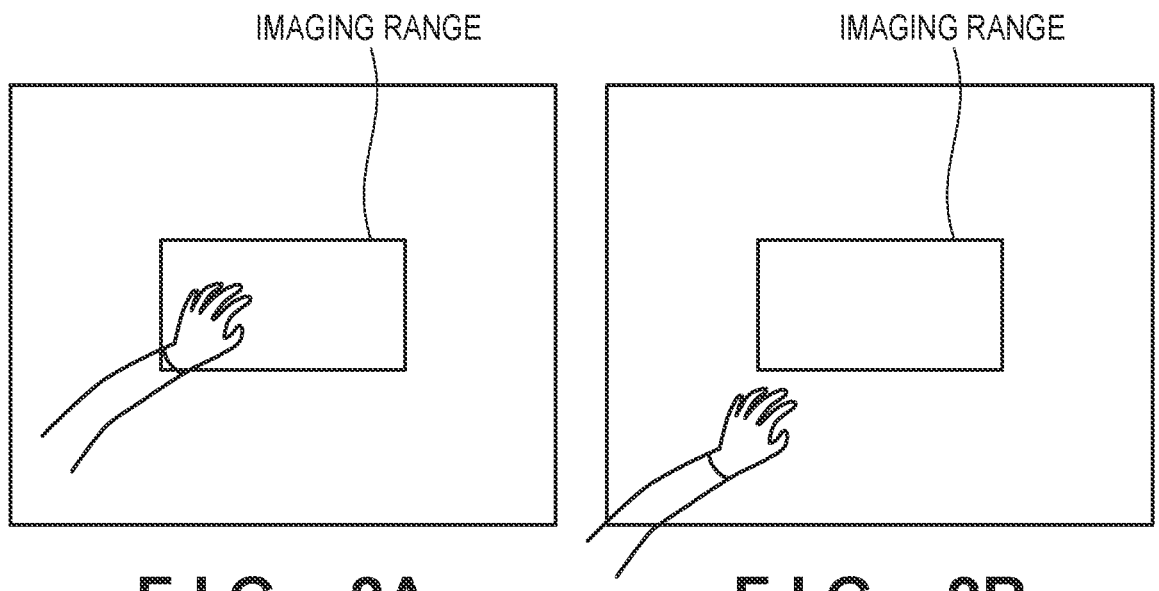
FIGS. 2A and 2B are views for describing an operation of a first embodiment.

As a result of the above, in the situation of FIG. 2A in which the measurement target object is captured within a captured image and in the situation of FIG. 2B in which it is not captured, it becomes possible to suppress power consumption of the depth camera 120 and various configuration elements that use the depth image from the depth camera 120.

Figure 3:
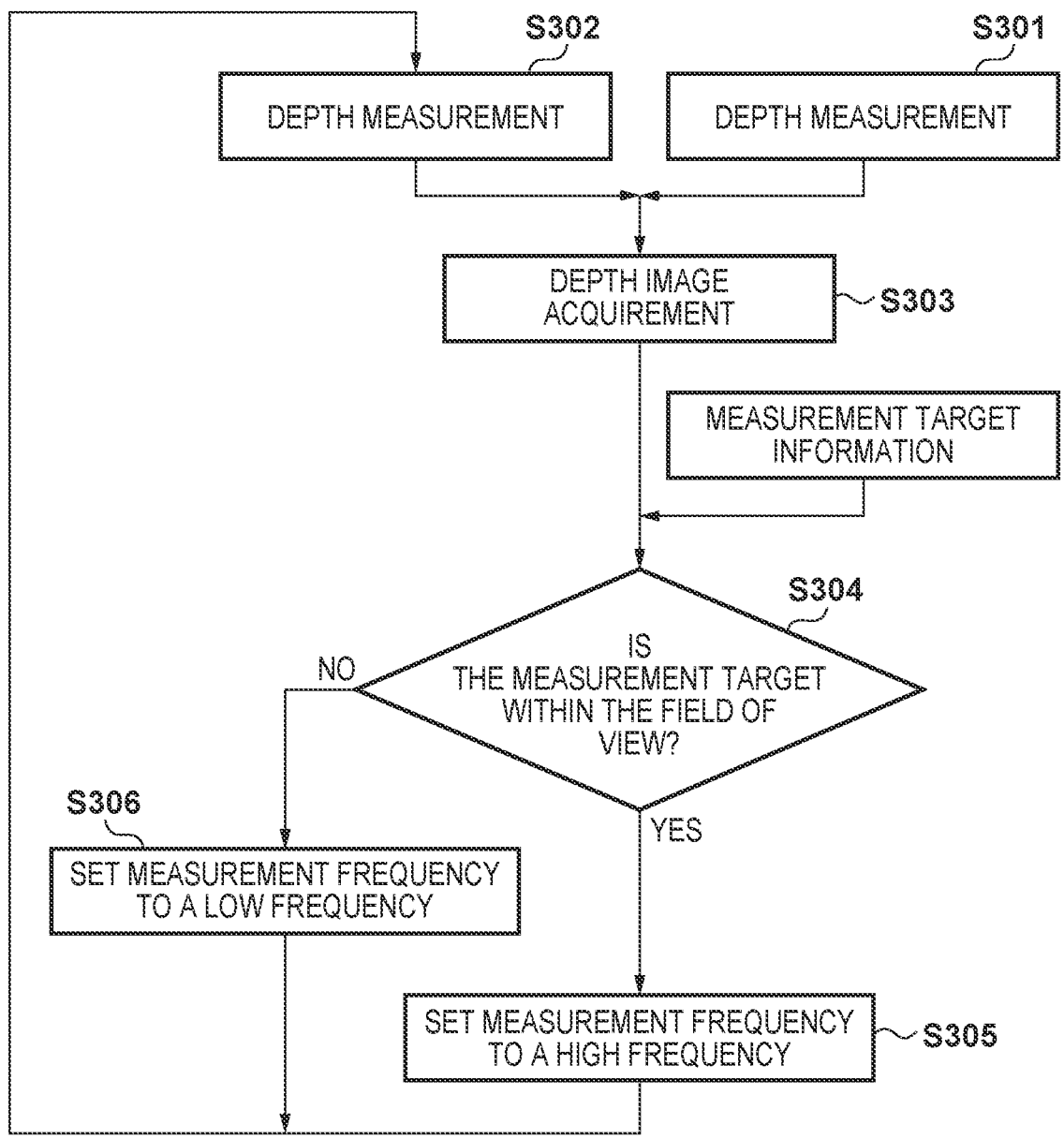
FIG. 3 is a flowchart for describing a processing procedure according to the first embodiment.

FIG. 3 illustrates a processing procedure (application) of the controller 400 in the information processing apparatus 300 in the embodiment. Hereinafter, description is given for processing of the controller 400 in accordance with the same figure.

In step S301 and step S302, the controller 400 performs depth estimation processing by the first and the second depth estimating units 350 and 360, and causes depth information to be generated in each. In step S303, the controller 400 controls the depth determining unit 370 to generate depth information of an accuracy higher than the depth information from the first and the second depth estimating units 350 and 360. Then, in step S304, the controller 400 determines whether or not the measurement target object ("hand" of the user in the embodiment) is present within the depth information based on measurement target information (it is assumed to be stored in advance in the model shape storing unit). Configuration may be taken such that the measurement target information is information for specifying the measurement target object and is shape information indicating a shape of a "hand" for example, and such that the controller 400 performs matching processing between the depth information and the shape information, and determines that the measurement target object is captured when matching positions are found. In a case where the measurement target object is determined to be captured, the controller 400 sets the frequency of the operating clock to the second depth estimating unit 360 to a high state (a frequency corresponding to 30 frames/second) in step S305, and requests the controller 250 of the HMD 200 for the capture frequency (may also be the measurement frequency) of the depth camera 120 to enter the high state (30 frames/second in the embodiment). Meanwhile, in a case where the measurement target object is determined to not be captured, the controller 400 sets the frequency of the operating clock to the second depth estimating unit 360 to a low state (a frequency corresponding to 10 frames/second) in step S306, and requests the controller 250 of the HMD 200 for the capture frequency (framerate) of the depth camera 120 to enter the low state (10 frames/second in the embodiment).

Note, in a period in which the capture framerate of the depth camera 120 becomes 10 frames/second, the depth determining unit 370 generates final depth information from depth information of both the first and the second depth estimating units 350 and 360 at a rate of one time for every three times. Then, the depth determining unit 370 determines the depth information from the first depth estimating unit 350 as final depth information at a rate of two times for every three times. This is because the depth information by the second depth determining unit 360 is updated every ¹⁄₁₀ seconds, so the accuracy with respect to the time axis decreases. The same is true for other embodiments described below.

In the foregoing description, although it is determined whether or not the measurement target object is captured by the matching processing between the depth information that the depth determining unit 370 determined and the shape information that the measurement target information indicates, limitation is not made to this. For example, the color of the hand of the user may also be measurement target information. In such a case, the target of matching is captured images instead of depth information stored in the image storing unit 310. Specifically, the controller 400 may determine whether or not a region of a predetermined size indicating the color of a hand is present within a captured image. Also, configuration may be taken such that the existence or absence of a measurement target object is determined by matching an image after performing edge detection thereon with a library of hand orientations prepared in advance.

Also, in the foregoing description, the final depth information of the measurement target object is determined by using the first depth estimation information and the second depth estimation information. However, this embodiment can be applied in a case where the final depth information is determined by only the second depth estimation information (distance information according to the depth camera). In this case, it becomes possible to suppress the electric power consumption by controlling the capture frequency of the depth camera 120 according to whether or not a measurement target object is captured.

Variation of First Embodiment

Although the HMD 200 is described as a video see-through type in the first embodiment described above, the HMD 200 may be an optical see-through type.

Figure 8:
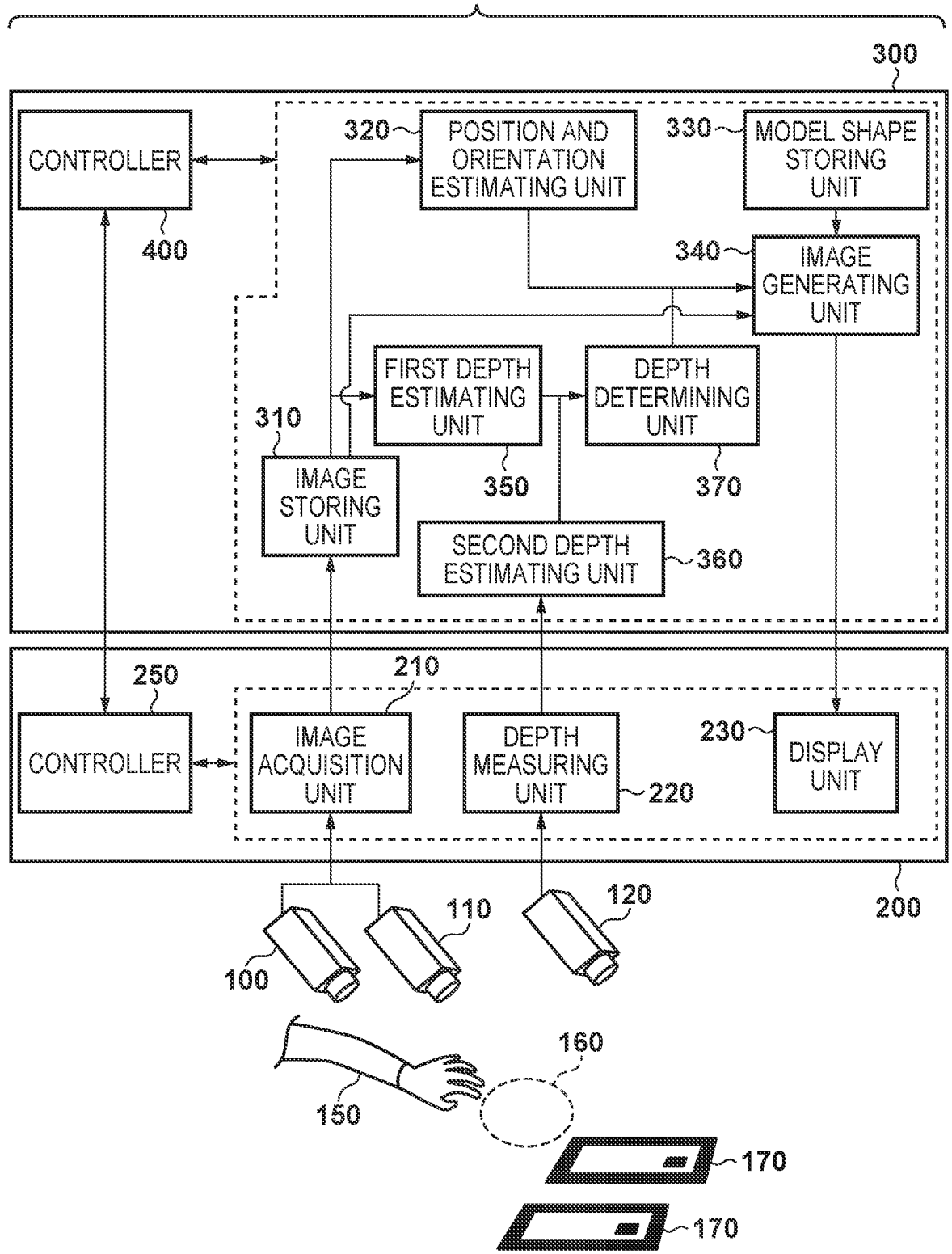
FIG. 8 is a system configuration diagram illustrating a variation of the first embodiment.

FIG. 8 is a block configuration diagram of a mixed-reality presentation system in such a case. There are two differences with FIG. 1A. The first is that the image combining unit 380 of FIG. 1 is not present. In other words, the CG object 160 that the image generating unit 340 generates is directly transmitted to the HMD 200 and is displayed on the display unit 230 of the HMD 200.

The second is that the image generating unit 340 recognizes a region that a "hand" of the user on whom the HMD 200 is mounted indicates. Also, in a case where a "hand" is closer to the user than the CG object, the image generating unit 340 renders the CG object, masking a region that the hand indicates.

Note, because it is necessary to obtain an image of the hand of the user that the user on whom the HMD 200 is mounted perceives visually, the cameras 100 and 110 and the image acquisition unit 210 are present in the HMD 200 similarly to in the first embodiment.

In the second and third embodiments describe below, although description is given assuming that the HMD 200 is a video see-through type, configuration may be taken such that the HMD 200 is an optical see-through type as in the present variation.

Second Embodiment

In the foregoing embodiment, the measurement accuracy of one configuration according to the depth estimation is lowered and power consumption is thereby reduced based on the determination of whether or not a measurement target object is present in a captured image. In the second embodiment, the measurement frequency is controlled based on whether or not a measurement target object is present in a predetermined range from the CG object. More specifically, based on whether a measurement target object for which the in front/behind relationship is to be determined is present between a CG object (the position within the space can be uniquely determined from information stored in the model shape storing unit 330) and the HMD 200, the measurement accuracy of one configuration for depth estimation is lowered to reduce the power consumption.

Specifically, the measurement accuracy of one configuration for depth estimation is lowered to reduce power consumption in a case where the distance between the measurement target object whose depth is estimated and the HMD 200 is sufficiently large with respect to the distance between the virtual object that should be displayed and the position of the HMD 200 (cameras 100 and 110).

Figure 4A:
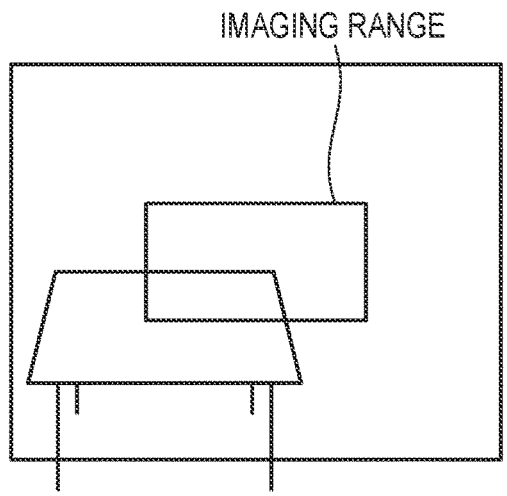
FIGS. 4A and 4B are views for describing an operation of a second embodiment.
Figure 4B:
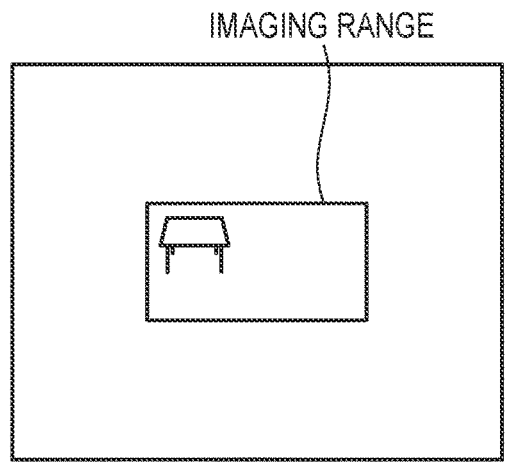

FIGS. 4A and 4B illustrate examples in which a measurement target object is a table. L1 represents a distance between the table and the HMD 200 in FIG. 4A, and L2 represents a distance between the table and the HMD 200 in FIG. 4B. Here, it is assumed that the displayed CG object is positioned at a location separated by a distance L0 from the HMD and in the same direction of the table. Also, let T be a threshold set in advance.

Currently, in FIG. 4A, L0+T≥L1. In such a case, because the distance between the CG object and the measurement target object is small, it is determined that it is necessary to determine at a high accuracy which one is positioned in front and which is positioned behind in relation to the HMD. Meanwhile, in FIG. 4B, in a case where it is determined that L0+T<L2, power consumption is reduced because the measurement target object is treated as being positioned sufficiently far from the virtual object and it is not necessary to determine with a high accuracy which one is positioned in the back.

Figure 5:
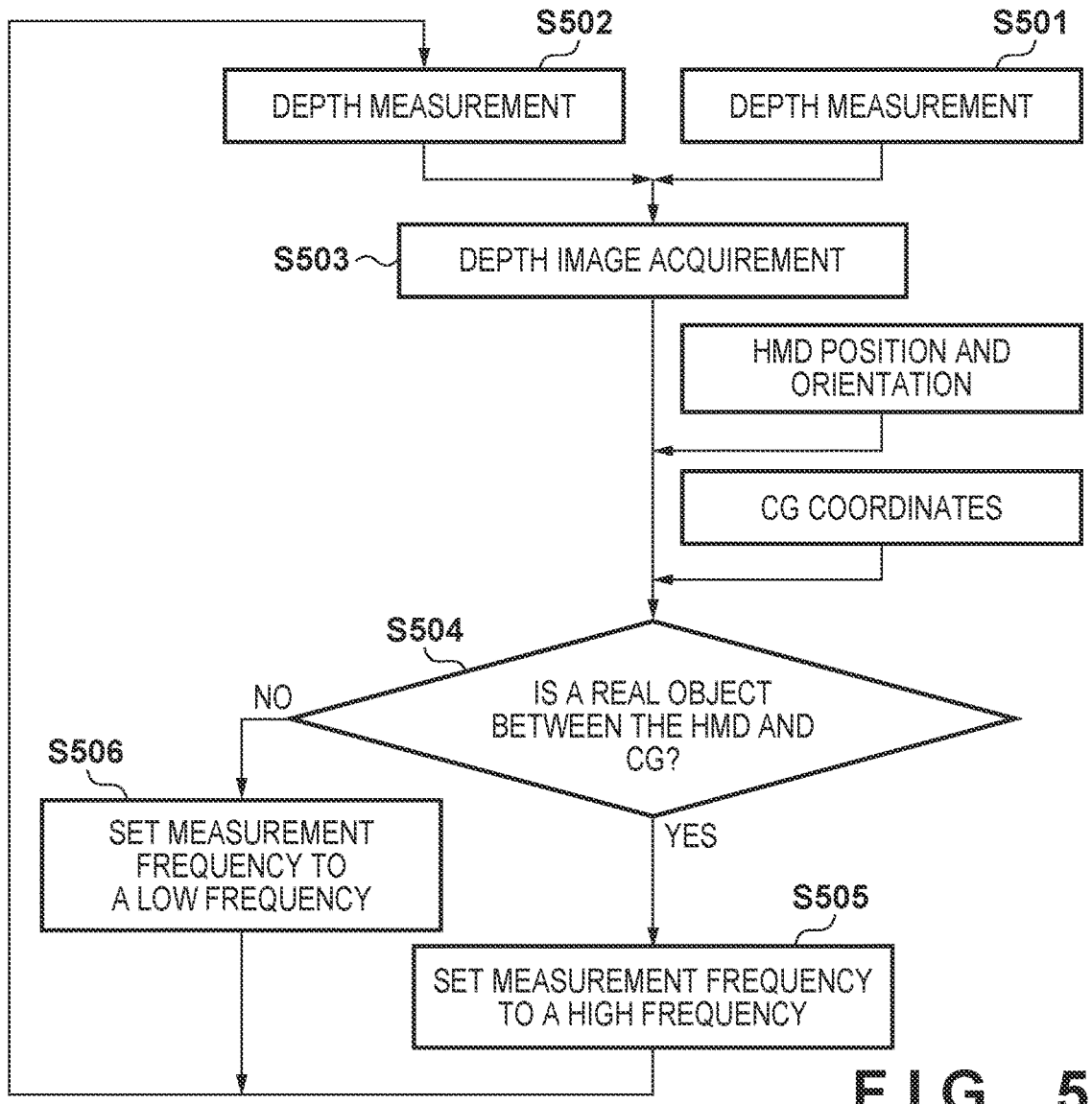
FIG. 5 is a flowchart for describing a processing procedure according to the second embodiment.

FIG. 5 illustrates a processing procedure of the controller 400 in the information processing apparatus 300 in the second embodiment. Hereinafter, description is given for processing of the controller 400 in accordance with the same figure.

In step S501 and step S502, the controller 400 performs depth estimation processing by the first and the second depth estimating units 350 and 360, and causes depth information to be generated in each. In step S503, the controller 400 controls the depth determining unit 370 to generate depth information of an accuracy higher than the depth information from the first and the second depth estimating units 350 and 360. Also, in step S504, the controller 400 acquires the position and orientation of the HMD 200 and the position of a virtual CG object to be displayed to determine whether or not the measurement target object is present between the HMD and the CG object, with reference to the depth information. Specifically, L0 represents a distance between the HMD and CG, and L(x, y) represents a pixel value (indicating distance) within the depth information. Also, in a case where a pixel that satisfies the condition: L(x, y)≤L0+T is present, it is estimated that there is a measurement target object between the HMD and the CG object. So, in step S505, the controller 400 sets the frequency of the operating clock to the second depth estimating unit 360 to a high state (a frequency corresponding to 30 frames/second), and requests the controller 250 of the HMD 200 for the capture frequency (framerate) of the depth camera 120 to enter the high state (30 frames/second in the embodiment). Meanwhile, in a case where a pixel satisfying the foregoing condition is not present, the controller 400 estimates that there is no measurement target object between the HMD and the CG object. Specifically, in step S506, the controller 400 sets the frequency of the operating clock to the second depth estimating unit 360 to a low state (a frequency corresponding to 10 frames/second), and requests the controller 250 of the HMD 200 for the capture frequency (framerate) of the depth camera 120 to enter the low state (10 frames/second in the embodiment).

Note, although a configuration in which the measurement frequency is controlled based on whether or not a measurement target object is present in a predetermined range from the CG object is described in the foregoing description, the predetermined range is a range in the depth direction between the HMD and the CG object. Limitation is not made to this and configuration may be taken to determine whether or not the measurement target object is present within the predetermined range from the CG object within the screen plane, for example. Specifically, in a case where the measurement target object is within the predetermined range (specifically, is near the CG object) within the screen plane, the measurement frequency is set to a high frequency. Meanwhile, in a case where the measurement target object is not within the predetermined range (specifically, is far from the CG object) within the screen plane, the measurement frequency is set to a low frequency. In such a configuration as well, the power consumption is suppressed because the measurement frequency is increased only when estimation of the in front/behind relationship in the depth direction between the measurement target object and the CG object is necessary.

Third Embodiment

In this third embodiment, description is given of an example in which it is determined whether or not a power saving mode is transitioned to based on whether or not the measurement target object is approaching or moving away within the field of view of the user on whom the HMD 200 is mounted.

In order to realize the third embodiment, the cameras 100 and 110 are given an imaging range (viewing angle) sufficiently wider than the display range displayed on the display unit 230 of the HMD 200. In other words, an image displayed on the display unit 230 is an image of a central portion of the image captured by the cameras 100 and 110.

Figure 6A:
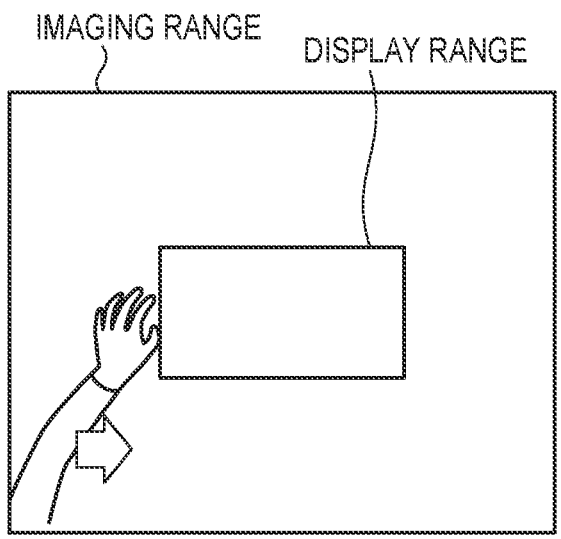
FIGS. 6A and 6B are views for describing an operation of a third embodiment.
Figure 6B:
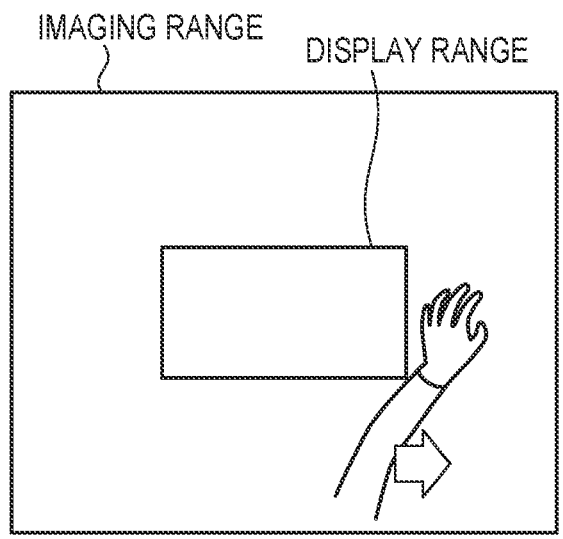

FIGS. 6A and 6B illustrate a relationship of an imaging range (outer frame) and a display range (inner frame) of the display unit 230 according to the cameras 100 and 110. The region that the display unit 230 displays as shown in the figure is narrower than the imaging range that the cameras 100 and 110 captured, and is a central portion thereof. In the present embodiment, in a case where a state in which the measurement target object ("hand" of the user) is approaching the display range is detected (state of FIG. 6A), execution of high accuracy depth information estimation processing is started. Meanwhile, in a case where a state in which the measurement target object is outside the display range, and is moving away is detected (the state of FIG. 6B), high accuracy is not required for the depth information, so power consumption is lowered. Note, because the relationship between the imaging range according to the cameras 100 and 110 and the display range displayed to the display unit of the HMD 200 is known beforehand, it can be determined from the position of the measurement target object within a captured image whether the measurement target object is within the display range or outside of it. Also, in the embodiment, because the cameras 100 and 110 capture at 30 frames/second, the position of the measurement target object is ascertained in intervals of 1/30 seconds. Accordingly, configuration may be taken such that it is determined from the position of the measurement target object of the current and previous time (1/30 seconds ago) and the display range whether the measurement target object is approaching the display range or moving away outside of the display range.

Figure 7:
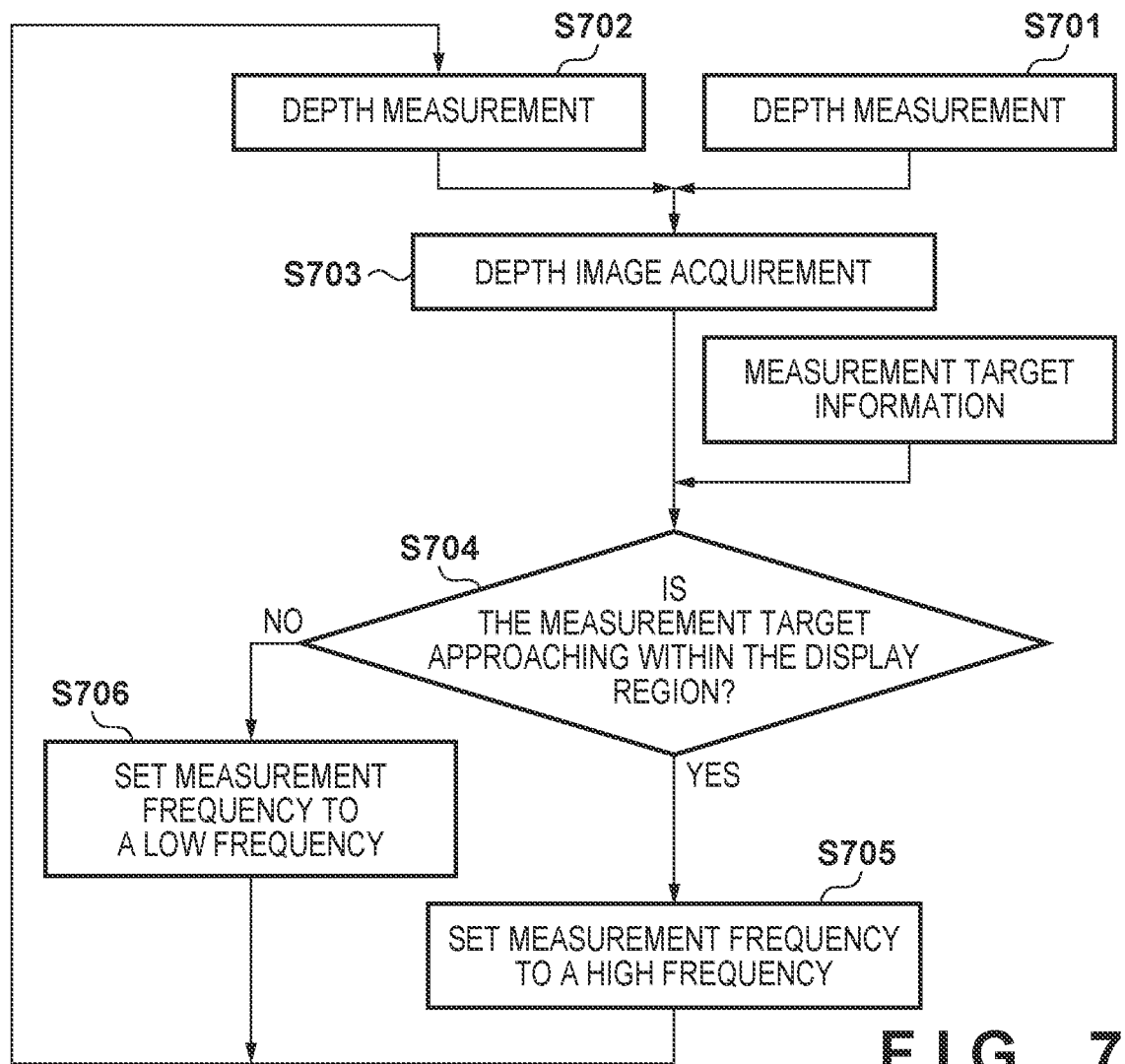
FIG. 7 is a flowchart for describing a processing procedure according to the third embodiment.

FIG. 7 illustrates a processing procedure of the controller 400 in the information processing apparatus 300 in the third embodiment. Hereinafter, description is given for processing of the controller 400 in accordance with the same figure.

In step S701 and step S702, the controller 400 performs depth estimation processing by the first and the second depth estimating units 350 and 360, and causes depth information to be generated in each. In step S703, the controller 400 controls the depth determining unit 370 to generate depth information of an accuracy higher than the depth information from the first and the second depth estimating units 350 and 360. Then, in step S704, the controller 400, based on the measurement target information (it is assumed to be stored in advance in the model shape storing unit) determines whether or not the measurement target information is approaching the display range based on the position of the measurement target object in the current depth information, the position of the measurement target object obtained the previous time, and the display range. In a case where it is determined that the measurement target object is approaching the display range, the controller 400, in step S705, sets a state in which the frequency of the operating clock to the second depth estimating unit 360 is high (a frequency corresponding to 30 frames/second), and requests the controller 250 of the HMD 200 for a state in which the capture frequency (framerate) of the depth camera 120 is high (30 frames/second in the embodiment). On the other hand, in a case where it is determined that the measurement target object is positioned outside the display range and is increasing in distance from the display range, the controller 400, in step S706, sets a state in which the frequency of the operating clock to the second depth estimating unit 360 is low (a frequency corresponding to 10 frames/second), and requests the controller 250 of the HMD 200 for a state in which the capture frequency (framerate) of the depth camera 120 is low (10 frames/second in the embodiment).

Note, it is assumed that during the period from when the measurement target object is determined to be approaching the display range until when it is determined to be moving away from the display range, the determination of step S704 is processed as Yes. Also, although it is determined that the measurement target object is approaching or moving away from the display range in the foregoing embodiment, configuration may be taken such that movement speed is considered.

Also, it is assumed that processing of a case in which the measurement target object is present within the display range conforms to the first embodiment or the second embodiment.

By virtue of the embodiments as described above, constant high power consumption is made to be unnecessary even if a plurality of position detection units are mounted, and it becomes possible to present virtual reality in a correct positional relationship between a virtual object and a measurement target object in real space at a sufficient accuracy to the user. Note, in the embodiment, although one depth camera 120 is shown as a configuration according to the detected position of the measurement target object in the real space other than the cameras 100 and 110, the type and the number of detected positions are not particularly limited.

Note, a device such as a smartphone may be used as long as it has the same function in place of the HMD 200 illustrated in the foregoing embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-203037, filed Oct. 14, 2016 and No. 2017-168835, filed Sep. 1, 2017, which are hereby incorporated by reference herein in their entirety.

What is claimed is:

1. An information processing apparatus connected to an image display apparatus, comprising:
    one or more processors; and
    a memory coupled to the one or more processors, the memory having stored thereon instructions which, when executed by the one or more processors, cause the information processing apparatus to function as:
        a first acquisition unit configured to acquire a real space image captured by an image capturing unit provided for the image display apparatus;
        a second acquisition unit configured to acquire data that is measured by a measuring unit which is provided for the image display apparatus and measures a distance from the image display apparatus to an object included in the real space;
        a generating unit configured to, generate, based on the data that indicates the distance acquired by the second acquisition unit, a combined image by superimposing a CG (Computer Graphics) object on the image acquired by the first acquisition unit; and
        a setting unit configured to set a measurement frequency of the measuring unit to a first measurement frequency in a case where a specific object is included in the image acquired by the first acquisition unit, and to set the measurement frequency of the measuring unit to a second measurement frequency lower than the first measurement frequency in a case where the specific object is not included in the image acquired by the first acquisition unit,
    wherein a display range that the image display apparatus displays is narrower than a captured imaging range that the image capturing unit captures, and is a central portion of the imaging range, and the setting unit,
    in a case where there is a physical object moving toward the display range within the image that the image capturing unit captured, sets the measurement frequency of the measuring unit to the first measurement frequency, and
    in a case where, outside of the display range within the image that the image capturing unit captured, there is a physical object moving away from the display range, sets the measurement frequency of the measuring unit to the second measurement frequency.

2. The apparatus according to claim 1, wherein the memory stores further instructions, which when executed by the one or more processors, cause the information processing apparatus to function as:
    an estimating unit configured to estimate a distance from the image display apparatus to the object based on a stereoscopic image of the real space captured by the image capturing unit, the image capturing unit being an image capturing unit that captures the stereoscopic image of the real space; and
    a depth determining unit configured to determine the distance from the image display apparatus to the object measured by the measuring unit based on the distance estimated by the estimating unit and the distance from the image display apparatus to the object measured by the measuring unit.

3. The apparatus according to claim 1, wherein the image display apparatus is an HMD, and
    the image capturing unit and the measuring unit are mounted to the HMD.

4. The apparatus according to claim 1, wherein the specific object is a hand of a user.

5. The apparatus according to claim 1, wherein the measuring unit is a sensor of a TOF method.

6. The apparatus according to claim 1, wherein, in the case where the specific object is included in the image, directions to the specific object and the CG object from the image capturing unit are the same and the distance to the specific object from the image capturing unit is shorter than the distance to the CG object from the image capturing unit, the generating unit generates the combined image by rendering a part of the CG object so that another part of the CG object is hidden by the specific object.

7. An information processing apparatus connected to an image display apparatus, comprising:
    one or more processors; and
    a memory coupled to the one or more processors, the memory having stored thereon instructions which, when executed by the one or more processors, cause the information processing apparatus to function as:
        a first acquisition unit configured to acquire a real space image captured by an image capturing unit provided for the image display apparatus;
        a second acquisition unit configured to acquire data that is obtained by a measuring unit which is provided for the image display apparatus, and measures a distance from the image display apparatus to an object included in the real space;
        a generating unit configured to, based on the data that indicates the distance acquired by the second acquisition unit, generate a combined image by superimposing a CG (Computer Graphics) object on the image acquired by the first acquisition unit; and a setting unit configured to set a measurement frequency of the measuring unit to a first measurement frequency in a case where a specific object in the image acquired by the first acquisition unit is present within a predetermined range from the CG object, and to set the measurement frequency of the measuring unit to a second measurement frequency lower than the first measurement frequency in a case where the specific object in the image acquired by the first acquisition unit is present outside the predetermined range, wherein the generating unit generates, in the case where the specific object is included in the image, the combined image which represents a distance relationship, from the image capturing unit, of the specific object and the CG object, and wherein the predetermined range is a range between a position of the image display apparatus and a position of the real space in which the CG object is displayed, in a depth direction of the captured image.

8. The apparatus according to claim 7, wherein the memory stores further instructions, which when executed by the one or more processors, cause the information processing apparatus to function as:

an estimating unit configured to estimate a distance from the image display apparatus to the object based on a stereoscopic image of the real space captured by the image capturing unit, the image capturing unit being an image capturing unit that captures the stereoscopic image of the real space; and a depth determining unit configured to determine the distance from the image display apparatus to the object measured by the measuring unit, based on the distance estimated by the estimating unit and the distance from the image display apparatus to the object measured by the measuring unit.

9. The apparatus according to claim 7, wherein the predetermined range is a range in which in an image plane of the captured image, a distance from the CG object is within a predetermined value.

10. The apparatus according to claim 7, wherein a display range that the image display apparatus displays is narrower than an imaging range that the image capturing unit captures, and is a central portion of the imaging range, and the setting unit, in a case where there is a physical object moving toward the display range within the image that the image capturing unit captured, sets the measurement frequency of the measuring unit to the first measurement frequency, and in a case where, outside of the display range within the image that the image capturing unit captured, there is a physical object moving away from the display range, sets the measurement frequency of the measuring unit to the second measurement frequency.

11. The apparatus according to claim 7, wherein the image display apparatus is an HMD, and wherein the image capturing unit and the measuring unit are mounted to the HMD.

12. A method of controlling an information processing apparatus connected to an image display apparatus, the method comprising:

acquiring a real space image captured by an image capturing unit provided for the image display apparatus;

acquiring data obtained by a measuring unit which is provided for the image display apparatus, and measures a distance from the image display apparatus to an object included in the real space;

generating, based on the acquired data indicating the distance, a combined image by superimposing a CG (Computer Graphics) object on the acquired image;

setting a measurement frequency of the measuring unit to a first measurement frequency in a case where a specific object is included in the acquired image; and setting the measurement frequency of the measuring unit to a second measurement frequency lower than the first measurement frequency in a case where the specific object is not included in the acquired image, wherein a display range that the image display apparatus displays is narrower than a captured imaging range that the image capturing unit captures, and is a central portion of the imaging range, in a case where there is a physical object moving toward the display range within the image that the image capturing unit captured, the first measurement frequency is set as the measurement frequency of the measuring unit, and in a case where, outside of the display range within the image that the image capturing unit captured, there is a physical object moving away from the display range, the second measurement frequency is set as the measurement frequency of the measuring unit.

13. A method of controlling an information processing apparatus connected to an image display apparatus, the method comprising:

acquiring a real space image captured by an image capturing unit provided for the image display apparatus;

acquiring data obtained by a measuring unit which is provided for the image display apparatus, and measures a distance from the image display apparatus to an object included in the real space;

generating, based on the acquired data indicating the distance, a combined image by superimposing a CG (Computer Graphics) object on the acquired image;

in a case where a specific object in the acquired image is present within a predetermined range from the CG object, setting the measurement frequency of the measuring unit to a first measurement frequency; and in a case where the specific object in the acquired image is present outside the predetermined range, setting the measurement frequency of the measuring unit to a second measurement frequency lower than the first measurement frequency, wherein in the generating, in the case where the specific object is included in the image, the combined image which represents a distance relationship, from the image capturing unit, of the specific object and the CG object is generated, and wherein the predetermined range is a range between a position of the image display apparatus and a position of the real space in which the CG object is displayed, in a depth direction of the captured image.

14. A non-transitory computer-readable storage medium storing a program which, when executed by a computer, causes the computer to execute steps of a method of controlling an information processing apparatus connected to an image display apparatus, the method comprising:

acquiring a real space image captured by an image capturing unit provided for the image display apparatus;

acquiring data obtained by a measuring unit which is provided for the image display apparatus, and measures a distance from the image display apparatus to an object included in the real space;

generating, based on the acquired data indicating the distance, a combined image by superimposing a CG (Computer Graphics) object on the acquired image;

setting a measurement frequency of the measuring unit to a first measurement frequency in a case where a specific object is included in the acquired image; and setting the measurement frequency of the measuring unit to a second measurement frequency lower than the first measurement frequency in a case where the specific object is not included in the acquired image, wherein a display range that the image display apparatus displays is narrower than a captured imaging range that the image capturing unit captures, and is a central portion of the imaging range, in a case where there is a physical object moving toward the display range within the image that the image capturing unit captured, the first measurement frequency is set as the measurement frequency of the measuring unit, and in a case where, outside of the display range within the image that the image capturing unit captured, there is a physical object moving away from the display range, the second measurement frequency is set as the measurement frequency of the measuring unit.

15. A non-transitory computer-readable storage medium storing a program which, when executed by a computer, causes the computer to execute steps of a method of controlling an information processing apparatus connected to an image display apparatus, the method comprising:

acquiring a real space image captured by an image capturing unit provided for the image display apparatus;

acquiring data obtained by a measuring unit which is provided for the image display apparatus, and measures a distance from the image display apparatus to an object included in the real space;

generating, based on the acquired data indicating the distance, a combined image by superimposing a CG (Computer Graphics) object on the acquired image;

in a case where a specific object in the acquired image is present within a predetermined range from the CG object, setting the measurement frequency of the measuring unit to a first measurement frequency; and in a case where the specific object in the acquired image is present outside the predetermined range, setting the measurement frequency of the measuring unit to a second measurement frequency lower than the first measurement frequency, wherein in the generating, in the case where the specific object is included in the image, the combined image which represents a distance relationship, from the image capturing unit, of the specific object and the CG object is generated, and wherein the predetermined range is a range between a position of the image display apparatus and a position of the real space in which the CG object is displayed, in a depth direction of the captured image.

* * * * *